May 19, 1970

R. S. KUBIK 3,512,543

FLOW CONTROL FOR SPRINKLERS

Filed Feb. 13, 1968

INVENTOR
Richard S. Kubik

BY
Schmidt, Johnson, Hovey,
Williams & Bradley.
ATTORNEYS.

United States Patent Office 3,512,543
Patented May 19, 1970

3,512,543
FLOW CONTROL FOR SPRINKLERS
Richard S. Kubik, 1030 Villa Vista Drive,
Colby, Kans. 67701
Filed Feb. 13, 1968, Ser. No. 705,094
Int. Cl. A01g 25/00; F16r 31/36
U.S. Cl. 137—119                      7 Claims

ABSTRACT OF THE DISCLOSURE

A flow control for water sprinklers has a pair of opposed water outlets that are aligned to receive corresponding valves which are interconnected and tapered so that alternate opening and closing of the outlets is, in each instance, equally progressive. A crankshaft is coupled with the composite valve arrangement through a loop on the valves receiving a crankpin.

---

Figure 1:
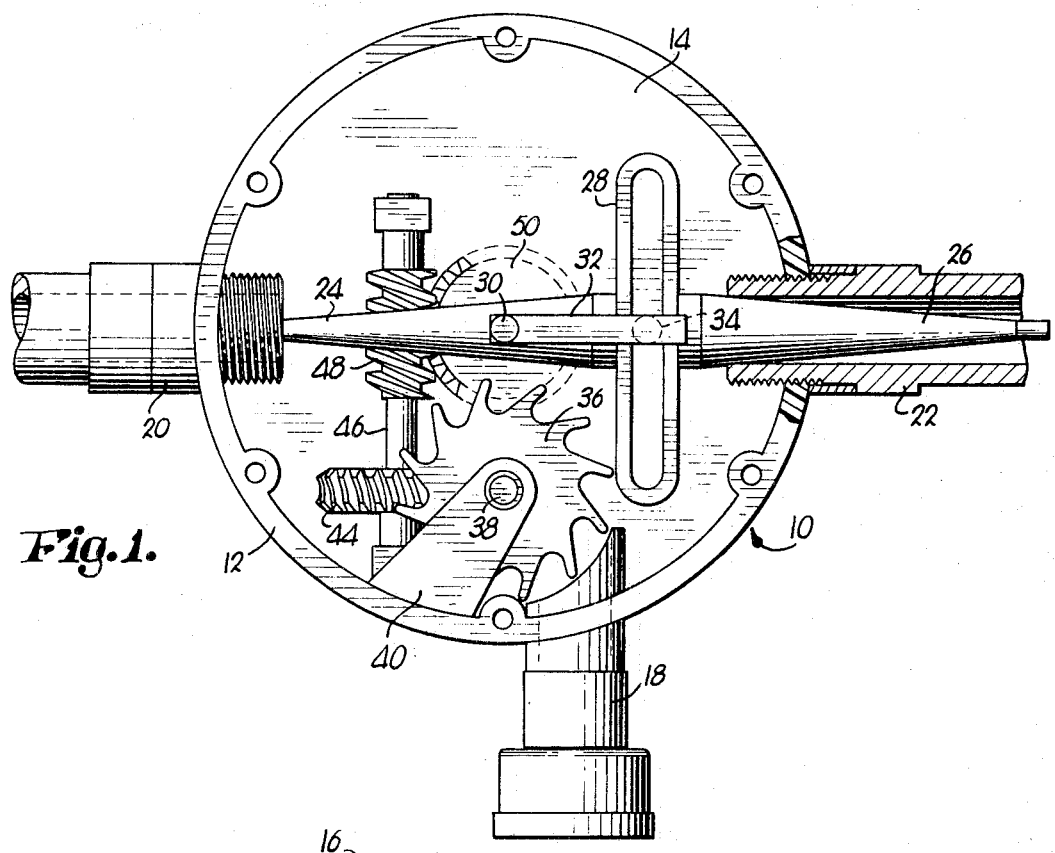

It is an important object of the present invention to provide a water sprinkler control for continuously and alternately increasing the water flow to one outlet, while at the same time, decreasing the water flow to another outlet, the opening and closing, in each instance, being gradual.

Another important object of my instant invention is the provision of a control for water sprinkling systems which utilizes a crankshaft to impart rectilinear reciprocation to a pair of tapering valves connected in back-to-back relation by a transverse loop that slidably receives a crankpin.

Figure 2:
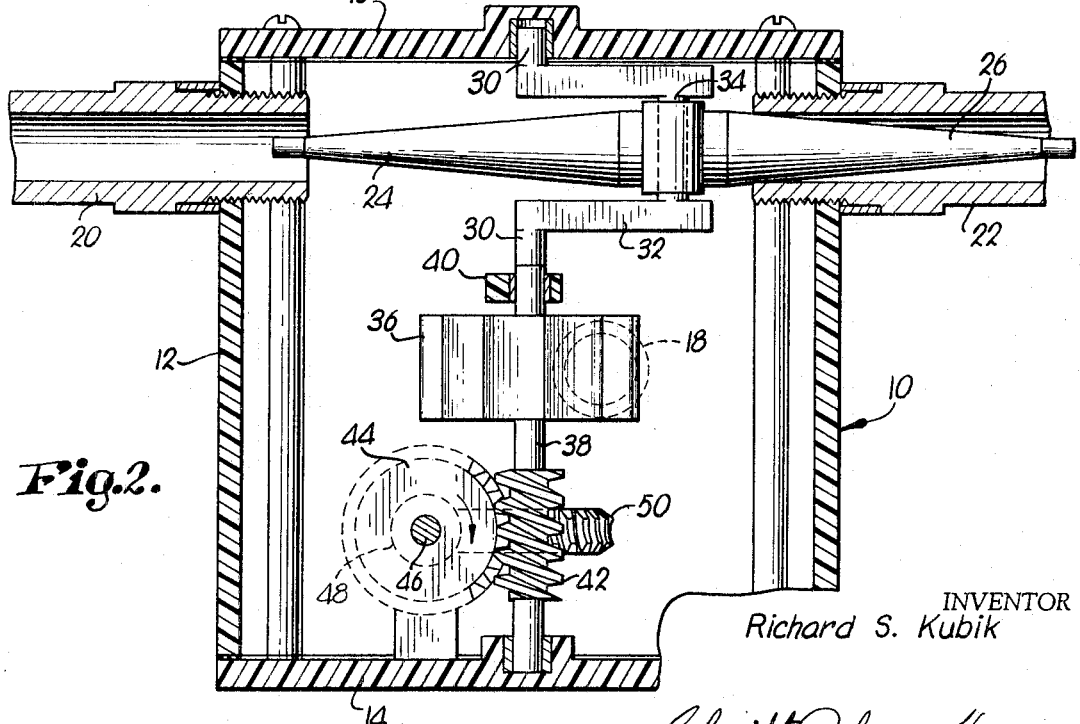

In the drawing:

FIG. 1 is a plan view of a flow control for sprinklers made according to my present invention with the top closure lid of the body entirely removed, parts being broken away and in section for clearness; and FIG. 2 is a vertical cross-sectional view through the body with the components therein illustrated in elevation.

For purposes of illustration, body 10 is shown with a cylindrical wall 12 having circular end plates 14 and 16, at least one of which is removable. A water inlet 18 and a pair of diametrically opposed water outlets 20 and 22 are provided in wall 12.

Tapers 24 and 26, serving as valves for outlets 20 and 22 respectively, are integrally joined by a cross loop 28 at their bases. A crankshaft 30, journaled in plates 14 and 16, has a crank 32 provided with a crankpin 34 which is slidable in loop 28.

A waterwheel 36 on shaft 38 is aligned with water inlet 18. Shaft 38, carried by plate 14 and by bracket 40 on wall 12, has a worm 42 that meshes with worm gear 44. Gear 44 is secured to shaft 46 supported by plate 14 and having a worm 48 which meshes with worm gear 50 affixed to shaft 30.

In operation, water entering the inlet 18 and impinging on wheel 36, rotates the latter to in turn rotate shaft 38 and worm 42 to drive gear 44. This effects rotation of shaft 46, worm 48, gear 50 and shaft 30. As pin 34 revolves about the axis of shaft 30 and slides in loop 28, rectilinear reciprocation is imparted to tapers 24 and 26.

As taper 24 moves into outlet 20 the flow of water therefrom gradually decreases until outlet 20 is closed by taper 24. At the same time, taper 26 opens outlet 22 and the flow of water from the latter gradually increases. On the return stroke of crank 32, flow increases gradually from outlet 20 and decreases gradually from outlet 22.

When used with sprinklers coupled with outlets 20 and 22, the control effects uniform watering of lawns, gardens, fields and the like without flooding. In each instance, the water has time to soak into the ground during the period of progressive opening and closing of the outlets 20 and 22. Complete closing of the outlets 20 and 22 is only momentary; at all other times water flows from both outlets simultaneously, the flow being equal only when the tapers 24 and 26 are midway along their paths of travel. The speed of travel of tapers 24 and 26 with a given water pressure depends on selection of the reduction gearing between wheel 36 and shaft 30 and upon the selected stroke of crank 32.

Having thus described the invention, what is claimed as new and desired to be secured by Letters Patent is:

1. A flow control for fluids comprising:
   a hollow body having a fluid inlet and a pair of fluid outlets;
   a valve in the body for each outlet respectively, each valve being adapted when actuated to open and close its outlet;
   a water wheel in said body responsive to flow of fluid therein from the inlet to said outlets; and
   means coupling said wheel with the valves for alternately opening and closing the latter during said flow of fluid through the body, with each valve progressively moving toward the open or closed position as the other valve progressively moves conversely toward the closed or open position.
2. The invention of claim 1,
   said valves comprising relatively long, slender tapers extending into corresponding outlets.
3. The invention of claim 2,
   said outlets being in opposed alignment,
   said tapers traversing the body between the outlets.
4. The invention of claim 3,
   and means interconnecting the tapers at their bases for rectilinear reciprocation.
5. The invention of claim 4,
   said coupling means including a shaft rotatable in the body and having a crank coupled with said interconnecting means.
6. A flow control for fluids comprising:
   a hollow body having a fluid inlet and a pair of fluid outlets;
   a valve in the body for each outlet respectively, each valve being adapted when actuated to progressively and alternately open and close its outlet;
   power means in said body responsive to flow of fluid therein from the inlet to said outlets;
   means coupling said power means with the valves for actuating the latter during said flow of fluid through the body,
   said valves comprising tapers extending into corresponding outlets,
   said outlets being in opposed alignment,
   said tapers traversing the body between the outlets; and
   means interconnecting the tapers at their bases for rectilinear reciprocation,
   said coupling means including a shaft rotatable in the body and having a crank coupled with said interconnecting means,
   said interconnecting means comprising a loop integral with the tapers therebetween,
   said loop having a major axis intersecting the path of reciprocation of the tapers, said crank having a crankpin reciprocable in the loop along said axis.

7. The invention of claim 6,
said coupling means including reduction gearing between the power means and the crankshaft.

References Cited

UNITED STATES PATENTS

| | | | |
|---|---|---|---|
| 1,855,647 | 4/1932 | Pottenger | 137—624.14 X |
| 1,918,596 | 7/1933 | Gill | 137—625.5 |
| 2,460,245 | 1/1949 | Summerville | 137—624.14 X |
| 2,589,650 | 3/1952 | Wolcott. | |
| 3,181,551 | 5/1965 | Coletti | 137—119 |
| 3,369,564 | 2/1968 | Puccinelli | 137—625.5 |

ALAN COHAN, Primary Examiner

U.S. Cl. X.R.

137—624.14